Dec. 22, 1970  R. L. MOORE  3,549,490

NUCLEAR REACTOR MOTOR

Filed Sept. 28, 1967  2 Sheets-Sheet 1

RICHARD L. MOORE
INVENTOR

BY
Beehler & Arant
ATTORNEYS

RICHARD L. MOORE
INVENTOR.

BY

Beehler & Arant
ATTORNEYS

United States Patent Office 3,549,490
Patented Dec. 22, 1970

3,549,490
NUCLEAR REACTOR MOTOR
Richard L. Moore, 1618 Irvine Ave.,
Newport Beach, Calif. 92660
Continuation-in-part of applications Ser. No. 849,318,
Oct. 28, 1959; Ser. No. 308,928, Sept. 12, 1963;
and Ser. No. 554,266, May 10, 1966. This application Sept. 28, 1967, Ser. No. 671,396
Int. Cl. G21c 7/00
U.S. Cl. 176—39                    16 Claims

ABSTRACT OF THE DISCLOSURE

The invention resides in a reciprocating type of motor which is directly driven by the power of a nuclear reactor. A piston is reciprocatably mounted in a frame. One end of the piston is exposed to a reservoir containing a solution of nuclear fuel and the other end of the piston is connected to a reciprocating power take-off. When a fission chain reaction takes place in the nuclear fuel, part of the fluid flashes into steam and the volume of a container in which the solution is placed expands, driving the piston outwardly against tension of a return device, as for example a spring. At the same time that the volume of the container expands, the energy generated in the solution diminishes. When the piston reaches the outer end of its stroke, the creation of energy diminishes to a point where the piston returns by action of the return device causing a reduction of the volume of the container, whereupon the rate at which the nuclear fuel generates energy is then increased causing another reciprocation of the piston. An additional weight may be attached to the piston to act in cooperation with a spring to set up a resonant condition which is calculated to complement the energy generating capacity of the nuclear fuel so that the reciprocating or pulsating effect is continued, automatically controlled, in order that work can be performed by the power take-off, without the necessity for control rod regulation, control rods being used only to start and stop the reaction.

---

The application is a continuation-in-part of co-pending applications Ser. No. 554,266, filed May 10, 1966, Ser. No. 308,928, filed Sept. 12, 1963, and Ser. No. 849,318, filed Oct. 28, 1959, now respectively abandoned.

The invention may be described as a pulsating nuclear reactor motor wherein energy surges generate a reciprocating mechanical movement, which is employed to do work.

Liberation of energy in a nuclear chain reactor however, occurs extremely rapidly, and because of its elaborate safety precautions must be taken to prevent such energy from reaching dangerously high peaks. In existing reactors such surges of power have heretofore been considered detrimental and means have been devised to eliminate them.

Reactors have been developed in which a moderator or a mixture of a moderator and fuel undergo rapid change in volume, or change from a liquid to a vapor state as the result of the heat of the nuclear chain reaction. It has been discovered, moreover, that such a sudden change in volume produces a slowing down or even shutting off of the chain reaction and discontinuance of operation. Such experimental reactors as have heretofore been employed to demonstrate certain principles have not been capable of directly producing useful work. Such a reactor is one identified as Godiva II, described in Nuclear Science and Engineering, volume 8, No. 6, December 1960, and in a later publication, Health, Physics Research Reactor, volume 16, No. 3, of July 1963.

Reactors depending upon a change of state to generate steam for conventional steam operated machinery have also been known, as evidenced by U.S. Pat. No. 2,936,273.

Presently used power reactors are limited in their power because of limitations on their heat transfer capability. Although power reactors have also been proposed which are not heat limited because the fuel solution itself is used as the working fluid in the energy extraction cycle, this type of reactor is as yet of limited economic value because of the difficulty and cost of providing adequate corrosion-proof material and shielding.

Reactor concepts such as disclosed in U.S. Pat. No. 2,875,143 have been suggested which utilize the change or expansion in volume of the critical fluid mass to effect control and regulation of the reactor and to effect movement of the hot liquid through a heat exchanger. Also there is a purely theoretical concept described in Journal of Applied Physics, volume 124 (1953), pages 815 and 816 by Kerner, which suggests the possibility of using direct expansion of gaseous fissionable material to drive an engine.

It is therefore among the objects of the invention to provide a new and improved method and apparatus for directly converting nuclear fission energy into mechanical work, which is not limited by heat transfer limitations Another object of the invention is to provide a new and improved method and apparatus for making use of the cyclical pulsing of the nuclear reactor to directly reciprocate a power take-off in order to perform mechanical work.

Still another object of the invention is to provide a new and improved nuclear power reactor capable of directly converting nuclear fission energy into mechanical work wherein the motion which attends the creation of mechanical work serves also to make the conversion of energy self-regulating.

Also among the objects of the invention is to provide a new and improved nuclear reactor which will be more efficient and more economical than those now in use.

Still another object of the invention is to provide a new and improved pulsating nuclear reactor which utilizes a piston and cylinder arrangement to convert the energy of the reactor to mechanical work by utilizing the expanding and contracting of the reactor fluids and the corresponding increase and decrease in reactivity of the reactor to control the operation.

With these and other objects in view, the invention consists in the construction, arrangement and combination of the various parts of the device, whereby the objects contemplated are attained, as hereinafter set forth, pointed out in the appended claims and illustrated in the accompanying drawings.

Figures 1, 1A:
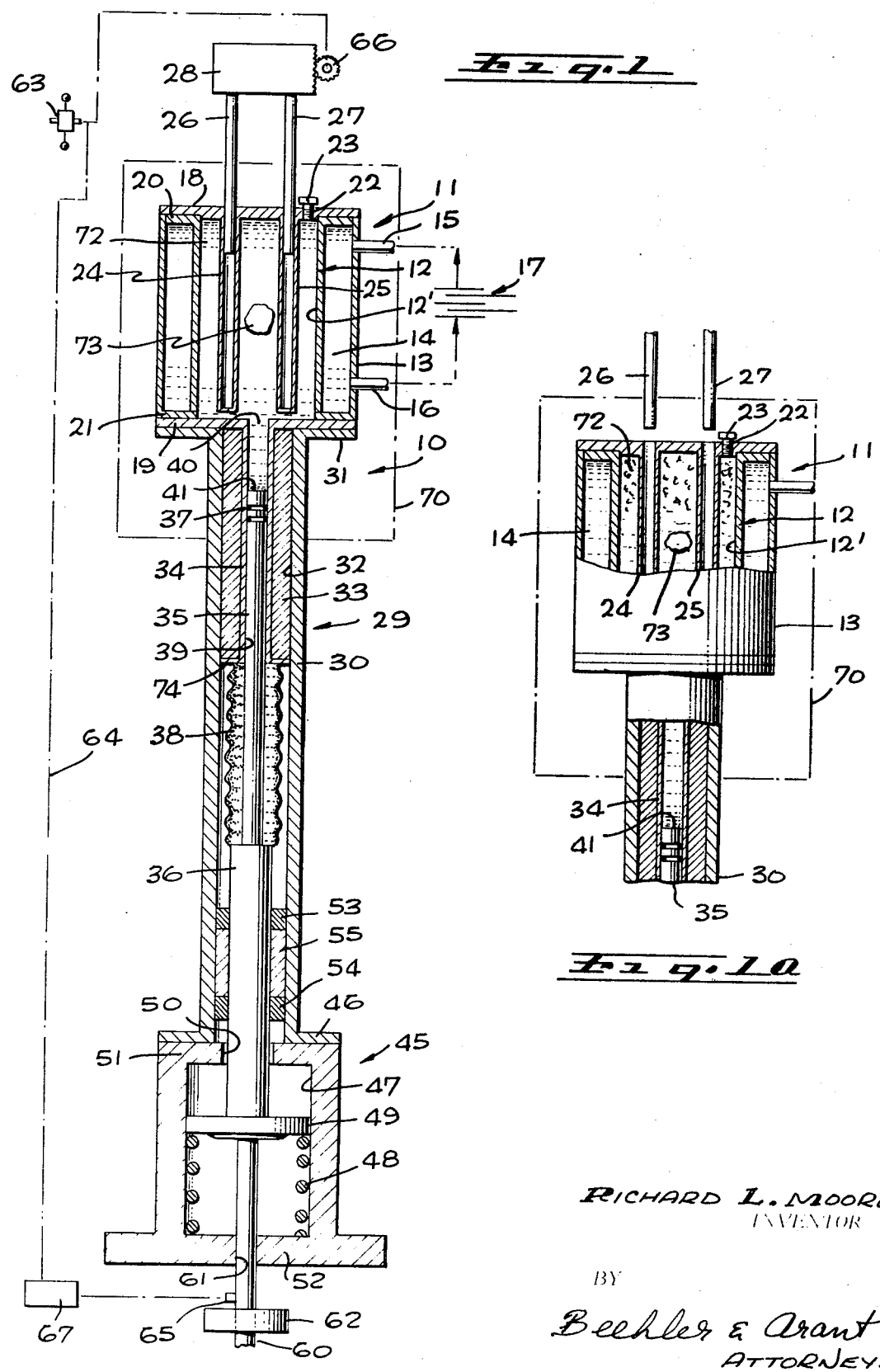
FIG. 1 is a longitudinal sectional, schematic view of a motor making use of nuclear fission energy.
FIG. 1a is a fragmentary longitudinal sectional view similar to FIG. 1 showing the piston in a different position.

In an embodiment of the invention chosen for the purpose of illustration there is what may be described generally as a frame assembly 10 which includes a fuel reservoir assembly, namely a nuclear reactor, indicated generally by the reference character 11, consisting of an interior cylindrical container 12 providing a chamber 12' for the nuclear fuel. Surrounding the container 12 is a jacket 13 forming an annular space 14 for circulating cooling water. An inlet pipe 15 is provided for introducing cool water into the annular space and an outlet pipe 16 is provided for taking the water used for cooling away from the annular space 14 and passing it through a cooling tower 17. Cylinder heads 18 and 19, respectively, may be provided at opposite ends of the fuel reservoir assembly, secured to appropriate flanges 20 and 21 in a conventional manner well known to those skilled in the art of reactor construction, the cylinder heads serving also to close opposite ends of the chamber 12'. A filler opening 22 extends through the cylinder head 18, closed by a plug 23, so that when occasion requires the plug may be removed to permit removal and replacement of the nuclear fuel solution.

Also extending through the cylinder head 18 are sleeves 24 and 25 for the accommodation of respective control rods 26 and 27, mounted upon an appropriate carriage 28.

Extending from the fuel reservoir assembly 11 is an elongated frame indicated generally by the reference character 29, the midportion of which consists of a tubular section 30 attached to the cylinder head 19 by means of a flange 31. Within the tubular section 30 is a cylindrical bore 32 which for a portion of its length is provided with an annular section 33 of shielding material. Located interiorly with respect to the annular section 33 is a power cylinder 34 which extends substantially throughout the length of the shielding material.

Reciprocatably mounted in the power cylinder is a piston 35. The piston, however, is substantially longer than the length of the power cylinder and extends outwardly with respect to the power cylinder to a location where it connects with a mass of material identified for convenience as a weight 36 which, in the present embodiment, is substantially an extension of the piston 35. Although the piston 35 is provided with appropriate piston rings 37, a bellows 38 is provided, sealed at one end to the power cylinder 34 and at the other end to the piston 35 at its junction with the weight 36, the bellows serving as a seal against the escape of fluid which may pass the piston rings 37. Although not shown, the interior of the bellows may be connected back to the chamber 12', by an appropriate system of tubing.

As will be noted a bore 39 of the power cylinder slidably accommodates the piston 35 and opens into communication with the chamber 12' through an opening 40, whereby the chamber 12' is in communication with the bore 39 and a driving surface 41 of the piston.

At the opposite end of the frame 29 is a housing 45 attached to the frame by means of a flange 46. Essentially with the housing 45 and the fuel reservoir assembly attached to the tubular section 30 as described, the combination comprises integral frame assembly. Within the housing 45 is a compartment 47 which houses a spring 48 and a weighted spring keeper 49. The weight 36 extends through a passage 50 in an end wall 51 of the housing 45 and is integrally secured to the weighted spring keeper 49. At the opposite end of the housing 45 is a second wall 52 which closes the compartment 47 and serves to support the end of the spring 48 opposite from the spring keeper 49. Bearings 53 and 54 separated by a spacer 55 serve to guide the weight 36 as it reciprocates in response to action of the piston 35.

Attached to the weighted spring keeper 49 and consequently to the weight 36 and piston 35 is power take-off shaft 60, the power take-off shaft extending outwardly through a passage 61 in the end wall 52. A brake 62 may be appropriately mounted on the housing 45 in a position surrounding the power take-off shaft 60 so that reciprocating motion of the power take-off shaft may be braked. To further control the device mechanically, that is to say, to govern the location of the control rods 26 and 27 in response to the reciprocating action of the power take-off shaft, there may be provided a mechanical governor 63 of appropriate conventional kind, having an extension 64 connected to the power take-off shaft 60 by means of a bracket 65 and acting through a mechanical converter 67 for changing reciprocating motion to rotary motion, whereby motion imparted to the power take-off shaft 60 and modified by action of the governor 63 acts through a connection 66 to the carriage 28 to control the degree of insertion or removal of the control rods 26 and 27.

In view of the nature of the nuclear fuel in the chamber 12', a shielding and reflector 70 of graphite, lead and concrete may be provided to entirely surround the fuel reservoir assembly 11 and the upper portion of the frame 30 which houses the piston 35 and bellows 38 so that there may be no emission of harmful radiation from those portions of the reactor which contain fissile or radioactive materials.

As has been suggested initially, the piston, the weight 36, weighted spring keeper 49 and spring 48 have a selected natural resonance and comprise a mechanical resonant system. The mechanical resonant system is especially important, because it provides the restoring forces and the basic time reference so that the piston will be constrained to move in approximate simple harmonic motion. It should be understood further that in the chosen embodiment the energy of motion of the mechanical resonant system should be of the order of ten or more times the energy released per cycle of operation by the reactor in order to provide the proper smoothing effect.

In the combination of these elements lies the key to use of the rate of change of void effect to control the rate of energy release so that it will in turn supply exactly the amount of energy needed to maintain the reactor frequency reasonable constant, and thus the frequnecy of oscillation of the mechanical system constant under rapid variation of the useful mechanical load.

Operation of the reactor consists of putting the piston slightly off top dead center by means of a suitable mechanical arrangement. The control rods are then withdrawn starting the chain reaction in the fuel solution. The resultant rapid heating of the fuel solution results in boiling of the liquid in the center and its conversion to the vapor phase. At this point, which is point 2 in FIG. 2, the brake is released, and the motion of the piston is permitted to begin. This motion causes an increase in the volume of the fuel solution vapor combination in the space formed by the cylinder walls and the piston. Simultaneously steam is being formed due to the increase in heat and does work against the piston end surface while the surface is moving. The fuel solution vapor continues to expand until the power from the chain reaction reaches its peak, shown at 80° on FIG. 2, and begins to decrease at about the time the piston reaches its mid-portion. The heat supply now decreases, and less steam is formed than is necessary to maintain the chamber pressure, namely at point 3. The steam is cooled adiabatically while doing work to the limit of the expansion stroke, point 4 on FIG. 2.

The return stroke of the piston from point 4 to point 2 is caused by the energy stored in the compression of the spring. Due to mixing with the cooler liquid and to condensation on the walls of the cylinder, the steam is cooled further during this stroke so that the piston has a small back pressure to work against until a certain point, 1, at which the pressure of the steam is increased by the compression of the piston. Finally, the piston again concentrates the fuel solution and vapor into a small volume as the chain reaction again begins to grow rapidly and the piston reaches top dead center, point 2, and the cycle is repeated.

Basically, operation of the pulsating reactor is concerned with the effect of changing volume due to void formation on the total reactor power. For simplicity of discussion it may be assumed that the reactor is uniform and relatively large, and that in the central part of the reactor the neutron flux is relatively uniform.

To explain the effect of change of volume of the reactor solution note should be taken of the expression $A = v\sigma nNV$, wherein $A$ = the number of nuclei undergoing fission per second;
$n$ = the average neutron density (i.e., number of neutrons per cc.)
$v$ = the average speed, so that $nv$ is the average neutron flux;
$N$ = the number of fissionable nuclei per cc.;
$\sigma$ = the cross-section for fission, assumed constant;
$V$ = the volume of the reactor, assumed variable.

When $n_t$ represents the total number of neutron and $N_t$ represents the total number of fissionable nuclei, the equation may then be written $$A = \frac{v\sigma n_t N_t}{V}$$

This being true, it is clear that the total number of fissions per second decreases if $V$ is increased, and increases if the volume is decreased, all other things being equal, since neither the total number of neutrons nor the total number of fissionable nuclei is affected instantaneously by changes in volume. In simplest possible terms, this is the effect of volume change on a chain reaction which is utilized in such a way as to control the reactor power.

To further particularize, if the derivative with respect to time is taken of the expression for log A and if $N_t$ is constant, then $$\frac{1}{A}\frac{dA}{dt} = \frac{1}{n_t}\frac{dn_t}{dt} - \frac{1}{V}\frac{dV}{dt} + \frac{1}{v\sigma}\frac{dv\sigma}{dt}$$

This expression is used also to determine the power as a function of time.

The intimate relation between the volume of the reactor container and the neutron flux, as shown by the foregoing equation, affords a degree of self-control not previously understood or utilized by reactor designers. The reason for this self-control lies in the relation between the external load on the mechanical system and the void volume. For example, if the external load should increase by a small amount, the piston motion would be slowed up and the volume would be smaller as a direct consequence. Practically instantaneously the reactor power would increase above that normally found and it would increase exponentially not linearly. Additional energy would then be imparted to the reactor liquid and would increase the steam pressure. The additional pressure available would increase the piston speed and thus drive it back to the speed corresponding to its natural frequency of operation. In fact, the piston would then "overshoot" its previous speed and reach a speed which is greater than its speed under the previous load. In such a case, the effect of the void rate of change would be such that the power (or instantaneous neutron flux) would be decreased. This decrease would not be toward the original power level, but toward the power level required to keep the mechanical system oscillating at its natural resonant frequency, with the increased mechanical output.

These definitions are helpful in view of discussion which follows:

Reactor period or reactor steady state period: The time in which the reactor power changes by a factor of $e$.

Reactivity: The rate at which the logarithm of the reactor power is changing, i.e. $\rho$ $$\rho = \frac{\beta}{e}(R-1)$$

$R$ = reactivity in "dollars"
$\beta/e$ = is the ratio of the undelayed fraction of neturons $\beta$ to neutron lifetime $e$.
$\phi$ = the change in steady state reactivity per unit change of reactor void volume.
$\Delta V$ = the change in reactor volume at a give time.

Mechanical resonance: The condition under which two quantities such as the mass of a material and spring constant of a spring connected to the mass have a natural frequency of oscillation. The frequency of oscillation of such a resonant system is given by well-known formulas such as the spring-mass constant, organ pipe resonance, pendulum frequency, etc.

Reactor kinetics: The study of the time dependence of reactor power.

EXAMPLE OF TYPICAL COMPONENTS OF ONE FORM OF PULSATING REACTOR SYSTEM

Nuclear fuel solution 72, 88 liters, consisting of 170 g./liter of U–235 as uranyl sulfate dissolved in light water. The inrichment factor should be at least 50%.

Cylindrical container 12, stainless steel, 16.6" I.D., 18.6" O.D., internal length of 28.6". Welded flanges each end for coupling to cylinder heads.

Cylinder head 18, 1" thick stainless steel with four tubes 24, 25 etc. of 2" O.D., and 11½" I.D. stainless steel. Tubes to permit control rods to enter reacting volume without touching the fuel. Tube length 24".

Power cylinder head end flange 19 welded to power cylinder 34.

Power cylinder 34 welded to flange 74 for attachment to bellows 18. Dimensions of power cylinder 3.15" diameter, 4.1" O.D., length 32", stainless steel, polished internally Piston 35, 3.10" diameter, length 50", stainless steel, provided with piston rings 37 and threads on end.

Weight 36, 6" diameter, hollow, 10 feet long; weighted keeper is mounted on end opposite from piston to have total weight of 500 lbs.

Main frame 30, a cylindrical annulus 10" I.D., 14" O.D., cast iron, length 14'3".

Two bearings 53 and 54 are 6" I.D. to guide the piston weight 36.

Spring frame 45 of cast iron is 17" I.D., 25" O.D., and 100" long, same as the spring and weighted keeper when the spring is extended.

Main spring 48 is a hot-coiled helical type, 16" displacemen combined compression and extension spring. The normal unstressed position is at half the rated displacement. The spring has 12 coils of bar diameter of 6", and has an outside diameter of 17". The height of the spring is 88", maximum length is 96" and minimum length is 80".

Weighted keeper 49 is coupled to the main spring 48 and to the weight 36.

End wall 52 is bolted to the spring frame and has the spring 48 bolted to it.

A control rod assembly 26, 27, etc. has preferably four rods and a requisitic driving mechanism.

Power take-off shaft 60 has one end connected to the weight 36 and the other end to an appropriate mechanical device (not shown), capable of beight actuated by the reciprocating motion of the power take-off shaft.

Bellows 38 should be attached to a return line and check valve for returning leakage to the cylindrical container.

Using the foregoing specifications the stroe of the reciprocating power take-off shaft may be approximately 16".

In cases where the load changes violently, to insure that the limits of the self-controlling feature are not exceeded, and that the system frequency does not deviate beyond reasonable limits from the resonant frequency, there is provided the centrifugal governed 63 of conventional design and linkages to maintain the pulsation frequency of the system constant. The governor senses the angular velocity of its shaft, and the sleeve is connected through an appropriate linkage which changes the position of the control rods so that there is an increase in reactivity proportional to the decrease in the relative angular frequency, i.e. $(\omega - \omega_0)/\omega_0$. The governor is designated to change the reactivity if its angular frequency averaged over a time of 10 to 20 cycles per second. By sensing and controlling the angular frequency, the governor controls the reactor pulsation frequency, and keeps it from drifting too far from the design frequency. The self-controlling feature of the void variation reactivity will keep the nuclear reactor power constant from cycle to cycle as long as the long term drift is controlled.

There is also provided an approximate conven tional safety device (not shown) to shut down the entire system in case of emergency or malfunctioning.

Cooling water jackets may be provided on all surfaces of the reactor, including the control rod tubes.

TABLE OF REACTOR CHARACTERISTICS (a)

Fuel and solution: 88 liters of uranyl sulfate in a light water solution with 14.96 kg. of U–235, enrichment: 50% to 100%.

(b)

Reactivity at top dead center: 1,720 sec.$^{-1}$
At bottom dead center: −1,720 sec.$^{-1}$
At half-way point: ±0.

(c)

Steady state reactor period at
Top dead center: +1/1720 seconds;
Bottom dead center: −1/1,720 seconds;
At half-way point: ∞

(d)

Mechanical system:
Cylinder: 16.6 inches internal diameter, 28.6 inches long.
Piston: 3.10 inches diameter, 50 inches long.
Stroke: 16 inches.
Spring: 12 coils, bar diameter 6 inches, outer diameter 17 inches, height 88 inches, extension 96 inches, compression 80 inches; spring constant: 100,000 lbs. per inch.
System weight: piston, connecting rod and weighted keeper are about 600 pounds weight.
Resonant frequency: 40 c.p.s.

(e)

Thermodynamic cycle: liquid-vapor, vapor formed at pressure of 2000 p.s.i., and temperature of 336° C., condensed at 14.6 p.s.i. and temperature of 100° C.

(f)

Power budget:

|  | Power | | Energy/cycle | | |
| --- | --- | --- | --- | --- | --- |
|  | H.P. | B.t.u./sec. | B.t.u. | Joules | Mw. sec. |
| Energy of fission | | 4,000 | 100,0 | 105,400 | 0,105 |
| Waste fission power | | 800 | | | |
| Power to form steam | | 3,200 | | | |
| Power rejected (1.83× 1,365) | | 2,497 | | | |
| Power output to piston | 1,000 | 708 | 17.7 | | |
| Power output from power take-off shaft | 800 | | | | |

Core parameters are not specified. Such items as leakage, resonance absorption, and thermal utilization are not given specifically since they are subsidiary variables, and their values follow directly from the reactivity specified and the details of the composition of the core, the pressure vessel, the position of the piston and the coolant and reflector.

SALIENT PRINCIPLES OF CONSTRUCTION (1) Design of the mechanical system;
(2) Calculation of the reactor nuclear parameters including (a) the steady state reactivity and (b) the power variation as a function of time;
(3) Thermodynamics of the liquid vapor cycle used;
(4) Theory of reactor kinetics, plus theoretical and experimental confirmation and the measurement of reactor "transfer functions" confirming predictions of coupling between a mechanical resonance and the neutron flux, and affording a means of measuring and adjusting reactor parameters during the necessary period of experimentation prior to bringing it to full power.

EXTENSION OF SALIENT PRINCIPLES OF CONSTRUCTION (1) Design of the mechanical system In the design of the pulsating reactor the first thing to determine is the desired output power which in the present design is 800 H.P. The mechanical transmission system is assumed to be 80%. This determines the net work output to be done by the steam liquid thermodynamic cycle if the frequency of operation is specified. The steam liquid cycle is discussed in a separate section and leads to the requirement on the mechanical system that the volume displacement of the piston be .095 cubic foot. The piston diameter is taken as 3.1 inches in order to have a piston capable of withstanding a great deal of force. The piston stroke then must be 16″ in order to give a volume displacement of 0.95 cu. ft. Knowing the piston and weight material, length and diameter, the total weight may be determined as 600 lbs. The required spring constant is calculated from Formula 3

$$k = W\left(\frac{f}{3.13}\right)$$

(see "Vibration and Noise," by Arthur L. Kimball in Kent's "Mechanical Engineering Handbook," 11th Edition, volume III, Wiley), so as to give a natural frequency of 40/sec., where $k$ is the force required to stretch a unit distance in lb./in. and W is the weight in lbs.

The energy stored in the spring when fully compressed is of the order of ten times that of work to be done by the reactor on each cycle in order that the resonant system will smooth out fluctuations in the design frequency.

The reactor walls are designed to withstand a transient pressure of 2,000 p.s.i., with an acceptable safety factor. The piston and transmission system is designed to withstand a force of 60,000 lbs. This is believed to be well within modern design practice. The materials must also be designed so that they will not quickly fatigue.

(2) Calculation of the reactor nuclear parameters

In this section, data and calculations are presented substantiating the nuclear design. The first step is the calculation of the reactor parameters at "steady state" and at a fixed position of the piston. In the reactor design, it is necessary that at top dead center the period of the reactor must be short compared to the period of the mechanical resonant system, and the reactivity must be positive. At bottom dead center, the period must be the same as at top dead center but the reactivity must be negative. At the half-way point of the piston stroke the seady state reactivity must be zero. In such a case, the period would be non-existent since the power would not change.

Following the calculations of the periods, and reactivity, a calculation of the reactor power as a function of time will be given to show that the logarithm of the power will be periodic, and substantiate the curves of reactor power vs. time previously given in FIG. 2. Finally the mathematical basis for expecting the reactor to be self-controlling under varying power demands will be given.

Although there is considerable latitude in determining the fuel concentration, for the purpose of illustration and ease of calculation departing to a minimum extent from proven practice, the KEWB design (to be discussed later), has been used for the starting point of the neutronics design. The simplest way to do this is by scaling up the size of KEWB to some larger value, and then calculating whether this scaled-up reactor would have the proper neutronic characteristics. The problem dominating the design at this point is whether the peak value of reactivity will be great enough so that the minimum reactor period at piston top dead center is much less than the period of oscilaltion of the piston (i.e. $\frac{1}{40}$ second). This relation must be true in order for the simplified calculations of the self-control principle to be admissible.

In order that the reactor power follow a sinusoidal variation, the period at bottom dead center must be equal to that at top dead center but the reactivity must be of opposite sign. This condition imposes the requirement that $(\beta/l)(R-1)$ at piston top dead center and all rods removed must be greater than $(\beta/l)(\phi\Delta V/2)$. This condition also assures that the reactivity may be made zero at piston half-way position.

There is next to calculate the approximate reactivity which would be available in a reactor of the same composition as the KEWB, but twice the radius (or eight times the volume). From calculations which are given later in this section $\phi$ is approximately $.010/\text{cm}.^3$, and $$\frac{\beta}{l}(R-1)$$

is found to be $9.1 \times 10^4$ sec.$^{-1}$. The inverse of this, the reactor period $1.1 \times 10^{-5}$ is much less than the design piston oscillation period, $\frac{1}{40}$ of a second, and thus the first of the above criteria is satisfied.

From the value of $\phi$, $\Delta V$, and $$\frac{\beta}{l}\left(\frac{\phi\Delta V}{2}\right)$$

is 1,720 sec.$^{-1}$, and thus the second criteria is satisfied that $$\frac{\beta}{l}(R-1)$$

is greater is greater than $$\frac{\beta}{l}\frac{\phi\Delta V}{2}$$

In addition, since 1,720 sec.$^{-1}$ is much greater than 40 sec.$^{-1}$, the reactor period at top dead center with control rods out is much less than the piston oscillation period.

The method of calculation of the neutronics as given before is more fully explained by the following discussion:

The particular KEWB reactor which was taken as the point of departure for the calculations has a measured void coefficient of reactivity of $-.005$ \$/cm.$^3$, a diameter of 11 inches, an approximate $\beta/l$ of 128 sec.$^{-1}$, the maximum value of R is \$4.00. Reference: D. L. Hetrick and D. P. Gamble, "Transient Reactivity during Power Excursion in a Water Boiler Reactor," 1958—Winter Meeting of the American Nuclear Society, Dec. 9, 1968.

To design a reactor of different radius, and/or reactivity, the designer would be able to get the approximate reactivity and the accompanying void coefficient of reactivity very simply by using the scaling law given by Davison in the book "Neutron Transport Theory," Oxford, 1957. The design of a reactor of eight times the volume (twice the radius) would use the following chain of calculations:

First, the relation from Davison is:

(1) $\quad a^3A - a^2B = (R-1)(\beta/l) \simeq (1/n)\delta n/\delta t$ where $a$ is the radius and A and B are unknown constants. $(R-1(\ /l))$ is used from the measured KEWB data. Upon taking the derivative of Equation 1 with respect to radius, it can be used in conjunction with the observed value of $\phi$, the void coefficient of reactivity, to obtain a second relation between A and B.

(2) $\quad a(3aA - 2B) = (\beta/l)(dR/da) = (\beta/l)(dV/da)\phi$ where (3) $\quad dV/da = 4\pi a^2$ Upon substituting (3) in (2), and the observed values of $a$, R (i.e. \$4.00) and $\phi$, in (1) and (2), the designer may determine A and B for a particular type of reactor.

Knowing A and B, equations (1) and (2) may then be used to obtain R and $\phi$, the reactivity and the void coefficient of reactivity to a reasonable approximation for any value of $a$.

As a further example, if the reactor radius desired is twice the radius of KEWB, the smallest value attainable of the reactor period (i.e. $[(\beta/l)(R-1)]^{-1}$) is $1.1 \times 10^{-5}$ sec. The coefficient of void reactivity is computed as $0.010$ \$/cm.$^3$.

In summary of the foregoing, a spherical reactor of design similar to the KEWB but twice the radius would have much more reactivity than that required to operate in a pulsating manner. Some slight changes must be made in the KEWB reactor design to make it suitable for pulsating reactor. The reactor vessel shape is changed from spherical to cylindrical, and additional thickness of stainless steel walls are provided. The internal cooling system is removed and the cooling provided by cooling the reactor walls to maintain them eblow the boiling point of the fuel solution during the expansion phase. Neither of these changes will make a significant change in the maximum reactivity achievable.

Figure 2:
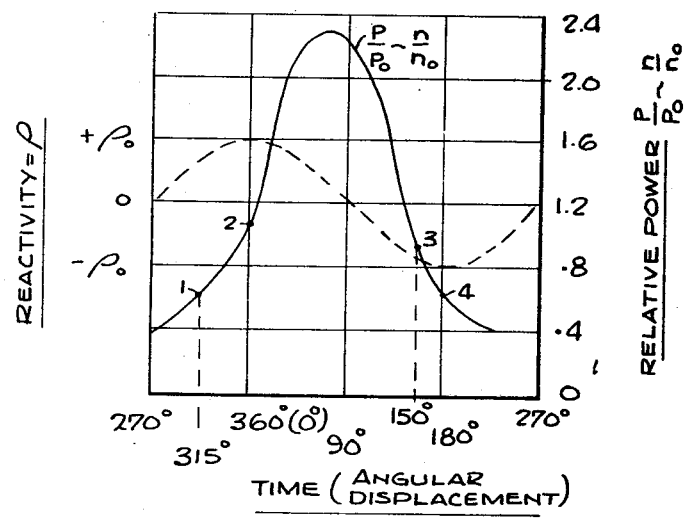
FIG. 2 is a diagram showing the relation between reactivity, power and time, or angular displacement.

Using the foregoing design for variation of the steady state reactivity as a function of the piston position, the following is the calculation of the variation of reactor power with time, on which FIG. 2 is based. Accompanying symbols are defined as follows:

$\rho$ = steady state reactivity at a given time = $(\beta/l)(R-1)$ and where $s = s_0 \cos \omega t$, in which $s$ stands for the expression $$\left(\frac{B\phi}{e}\right)\frac{\Delta V}{2}$$

$\omega$ = angular frequency of pulsation
$t$ = time
$\dot{n}$ = rate of change of neutron flux density
$n$ = neutron flux density
$\dot{V}$ = rate of change of void volume $B_2$ where the void volume follows the formula $$V = \frac{\Delta V}{2}(1 - \cos \omega t)$$

$b$, $B_1$, $B_2$ = constants, and $V_r$ is the volume of the chamber.

In this computation, it is assumed that the size and therefore the average density of the reactor is controlled by an external force which imparts a sinusoidal fluctuation on the above reactivity due to void formation and destruction. The magnitude of this force is correlated to the size and power of the reactor as has been shown in the mechanical design section. To simplify discussion of the power variation it is assumed that temperature effects may be lumped with void effects, thus, using the equation of reactor kinetics given later.

$$\dot{n} = n(\rho - B_1 \dot{V})$$

where $$B_1 = 1/V_r, \quad B_2 = 1\Big/\left(\frac{\beta}{l}\right)\phi$$

substituting the values for $s$ and $V$ $$\dot{V} = -B_2 s = B_2 \rho_0 \omega \sin \omega t$$

it follows that $$\dot{n} = n s_0 [\cos \omega t - b\omega \sin \omega t]$$

$$\dot{n} = n s_0 [\cos \omega t - b\omega \sin \omega t]$$

(where $b$ is approximately $1/100{,}000$)

From which it is easy to show that $$\ln\left(\frac{n}{n_0}\right) = s_0 \left[-\beta + \left\{\left(\frac{1}{\omega}\right)^2 + b^2\right\}^{1/2}\right] \sin(\omega t + \sigma)$$

$\sigma = \tan^{-1}(b\omega)$

Since $b\omega$ is much less than one it is seen that $n$ is almost 90 degrees behind the reactivity variation given by $s_0 \cos \omega t$; that $\log(n/n_0)$ is periodic with time; that $n/n_0$ follows the curve given in FIG. 2. It may also be shown that $$\frac{\partial(\ln[n/n_o])}{\partial \omega}$$

is such that a sudden slowing of the speed ($\Delta\omega<0$) will result in an increase in the amplitude of ln ($n/n_0$) and vice versa for an increase in speed ($\Delta\omega>0$). Thus illustrating the nature of the feedback, when a load is taken off speeding up the reactor, the logarithm of its power is decreased, therefore, the reactor slows down and the reactor speed is controlled. The opposite happens when a load is placed on the reactor, i.e. the reactor speeds up to compensate for the load. This effect would not be found if the term proportional to the rate of change of void were not present.

Although the exact calculations of all these parameters will differ somewhat from the final result, as for example has been found in the power density capabilities of boiling water reactors, the reactor operator skilled in the art will use various means to gradually bring this engine up to the full rated power and possibly more. In addition to well-known techniques, he will in particular use the method of on-line transfer function analysis as was proposed by P. N. Haubenreich. P. N. Haubenreich, in "Nuclear Safety," vol. 5, #4, page 355, proposed the use of "on-line" transfer function measurement equipment to determine as a function of power the shape of the frequency response spectrum. He will also measure the "gain" and adjust the reactor parameters until it is zero at operating power. This will give him the "reactor system resonant frequency" which should be the same as the mechanical resonant frequency. The operator may modify some of the details of the design, but not the system of self-control, as experience indicates. Thus he may change the reactivity, the operating temperature, the coolant flow, the power output (load), as well as the resonant frequency and the energy storage until the exact characteristics of the particular design are known. He would take care to do these things in increments of increase and change so that the inherent stability would not be altered, but enhanced and so that no mechanical safety limitations would be exceeded.

(3) Thermodynamics of the liquid-vapor cycle

The design output power of 800 H.P. mechanical, with a mechanical efficiency of 80% implies that the mechanical rate of doing work must be (1/.8) 800 H.P. or 1,000 H.P. Thus the net thermodynamic output must be 1,000 H.P.

In the calculation of the power which must be converted from heat energy to mechanical energy, the thermodynamic cycle for the fuel solution must be determined. For design purposes, it is assumed that the solution of $UO_2SO_4$ dissolved in light water has approximately the same thermodynamic cycle as the water-steam cycle analyzed by A. S. Thompson (Ref.: Atomic Energy Commission Report, AECU No. 135).

According to Thompson's analysis, a wide variety of possible cycles is available. Thompson's liquid-vapor cycle may be understood by reference to FIGS. 3 and 4.

Figure 3:
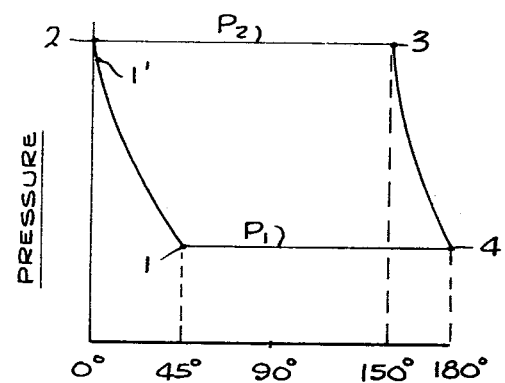
FIG. 3 is a pressure-volume diagram of the cycle used for the embodiment of FIG. 1.
Figure 4:
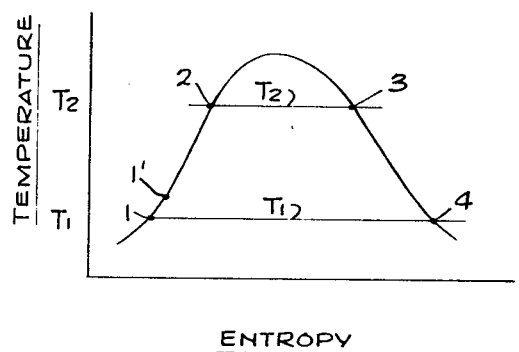
FIG. 4 is a temperature entropy diagram of the cycle used for the embodiment of FIG. 1.

Beginning at point (1), FIG. 3, the medium is compressed from pressure $P_1$ to pressure $P_2$, the temperature, FIG. 4, remaining essentially constant to point 1'. Between point 1' and 2 the medium is heated at constant presure $P_2$ to the vaporization pressure $T_2$ corresponding to pressure $P_2$. From 2 to 3 heat is added at constant temperature $T_2$ and $P_2$ to vaporize the liquid. From 3 to 4, following Thompson's approximate curve of T vs. entropy, work is done by the medium in returning it to pressure $P_1$ and temperature $T_1$. From point 4 to 1 heat is rejected to a heat exchanger.

For the purpose of obtaining an approximate estimate of efficiency and to illustrate the operation, the above cycle is modified as follows: At point 1 on FIGS. 2, 3, and 4, the temperature and pressure are at $T_1$ and $P_1$ respectively. As the piston compresses the medium in passing from the position 1 to 2 (top dead center), heat is also added to raise the medium to temperature $T_2$ and pressure $P_2$ at point 2. This portion of the cycle corresponds to accomplishing the steps from point 1 to 1' to 2 shown in FIG. 4 at the same time. It is believed that for purpose of this discussion little error is made in this approximation. From point 2 to 3 work is done by the medium against the piston while heat is being added by the fission of U-235. It is considered a conservative estimate, i.e. a lower limit on the cycle efficiencies to follow Thompson's cycle of adding heat at constant pressure from point 2 to 3 for two reasons: First, each macroscopic portion of the medium which is vaporized into steam will pass through the cycle, although not all simultaneously. Second, the pressure may well increase temporarily above that assumed, thus giving better thermodynamic efficiency than estimated. The mechanical system has been designed with this possibility in mind.

From point 3 to 4, the fission rate (see FIG. 2) has decreased to a small fraction of the peak rate and thus the expansion of the medium against the piston along the saturation line is taken following Thompson as a good approximation to what would happen in this cycle. From point 4 to 1 heat is rejected by the steam recondensing on the cool walls of the cylinder and piston and in the cool portion of the liquid. At point 1 the cycle begins again.

For design purposes the water-steam cycle was selected as given by Thompson in which work is done (from point 2 to 3) at steam pressure of 2,000 p.s.i. and temperature of 336° C., and heat rejected at the pressure of 14.96 p.s.i. and temperature of 100° C. from point 4 to 1. The useful work output given by Thompson of such a cycle is 386.7 B.t.u./lb.; the cycle efficiency is 28.3% and the heat to be rejected is given as 1364.6—386.7 B.t.u./lb. Since 1000 H.P. is equivalent to 707 B.t.u./sec., then 707/386.7 equals 1.83 lbs. of liquid which must be cycled per second to obtain the required energy.

To determine the amount of solution which must be utilized per cycle, the above amount per second is divided by 40, the number of cycles per second chosen for this design. Thus .046 lb. of solution must be evaporated, expanded while doing work through a volume of .095 cu. ft. and recondensed on each cycle.

From an analysis of the spatial distribution of the fission density which will be highly peaked near the center of the reactor, only the water in the very center of the reactor is raised to the high temperature of boiling at the maximum pressure, i.e. 2,000 p.s.i. Thus there is no need to provide ultra high temperature material for the cylinder walls, nor to make use of exotic or special materials of low neutron cross-section for these walls.

To accomplish the above-cycle and deliver the desired power, the steam must be expanded at an average pressure of 1,000 p.s.i. through a change of volume of .095 cu. ft. The product of average pressure and expansion volume has been conservatively underestimated so that if any slight variations should occur from that estimated, the power output will have been underestimated. The above required expansion volume taken together with the desired diameter of the piston determines the length of the piston stroke. Taking the piston diameter as 3.1 inches, the piston stroke must be 16 inches.

The conservative nature of the estimate of cycle efficiency of 28.3% may be understood from the well-known result that in electric discharges in water approximately 50% of the discharge energy is converted into acoustic energy (i.e. pressure waves) in the first expansion of the bubble and 50% of the remaining energy is given up on the next expansion.

The above thermodynamic analysis is independent of the type of piston used or mechanical system to which the reactor is coupled.

(4) Theory of reactor kinetics

While many reactors have been constructed and operated which involve a change of state in the fuel and/or moderator.

This is especially true with regard to the effect of the rate of change of voids which occur in such reactors. In the differential form of the equation, the dependence on volume, previously discussed, leads to a term proportional to rate of change of volume (or void).

Because of this discovery it may now be utilized in reactor design, construction, and operation and this forms an important basis of the present invention as hereinbelow set forth.

There are essentially three pure types of power transients in a nuclear reactor. This division into pure types is done for convenience of discussion only. Normally two or more of these pure types will occur simultaneously. A first type occurs in reactors which are sub- or supercritical due to the position of the control rods and whose temperature and density is constant. This is the usual type of reactor transient and is denfied as "steady state reactivity." A second (pure) type occurs in reactors where the local density fluctuations of either the neutron number density or the fuel density can occur for reasons such as local heating or cooling, transmission of sound waves through the reactor material, while at the same time the control rod position and the cross-sections change only slightly with time. The motion of the material in the reactor such as moderator or coolant, may be or may not be transmitted to the neutron fluid in order to have effects due to this cause. The rate of change of void volume introduces a change of reactivity both through its instantaneous effect due to the extra term added to the reactor kinetics equation and through the gradual change in the steady state reactivity because the void volume has increased or decreased. The instantaneous effect is defined as "void variation reactivity."

A third (pure) type of reactor transient is the changing of the effective reactor cross-sections by the rapid change of either temperature or the energy spectrum of the neutrons, such as introduction of a poison or its withdrawal etc. with however the condition that reactivity and density otherwise remain relatively constant. Thus, the rapid change in temperature may affect that power level by (a) changing the reactivity, and (b) by the term which involves the rate of change of temperature, this effect identified herein as "temperature variation reactivity."

Since the original application was submitted in 1959 of which this is a continuation-in-part, several investigations of reactor kinetics have been reported in literature which support my concept of reactor design and of self-control. Two examples are sufficient to illustrate this invention.

First, it has been shown that a pulsed-solution reactor can be safely designed to generate power bursts with minimum periods and energy release rates much greater than have been proposed in this or the parent applications (which is approximately $1/10$ mw. sec.).

Second, by measuring reactor "noise transfer functions" unexpected resonances were found to occur in three different reactors at high power. These resonances were found to be related to the motion and/or boiling of the water in the reactor through neutronic coupling.

Third, several investigations support the analysis used herein that void formation due to boiling is an important factor, and indeed even the dominant mechanism when it occurs.

All of these phenomena are consistent with theories of reactor kinetics herein disclosed and not predicted by previous theories.

REACTOR SYSTEM TEST AND START-UP

To start the reactor for the first time and to test the system the following procedure would be followed:

(A) With control rods 26 in, and with the spring 13 extended by a suitable jack (not shown) so that the piston is just beyond top-dead center, the liquid fuel solution 72 of U-235 $SO_4$ dispersed in a bath of $H_2O$ is pumped into the cylindrical container 12.

(B) The spring 13 is held in position by means of the brake 62 on the power take-off shaft 60. The filler opening 22 is then closed by the plug 23.

(C) At low power levels, the reactivity of the system is measured by observing the rate at which the logarithm of the power changes with time (i.e. the reactor period) as a function of the position of the control rods 26, 27.

(D) This measurement is repeated at various positions of the piston by jacking the spring and piston to different positions. In this test voids are introduced in a controlled manner by introducing an air filled resilient container 73 in the center of the reactor.

(E) If the steady-state reactivity as a function of position is found to be according to design, this portion of the test is complete. If such is not the case, changes are made in the reactivity by introducing reflectors of varying properties, i.e. by shimming the flux to achieve the design situation.

(F) With the piston 35 just past the top extreme position and the brake 62 on, the reactor power will be brought near to design power, by oscillating the control rods 26, 27 in appropriate time phased sequence. At the same time, appropriate pressure measuring instruments will be used to determine the point in the reactor power cycle at which boiling of the $H_2O$ in the nuclear fuel solution begins and the rate at which the pressure increases as a result.

(G) The next step is to preheat the reactor to the expected pressure by slow boiling with the reactivity set near zero. Next, the control rods 26, 27 are moved to the position at which the design reactivity is achieved. When the reactor power reaches the point near which boiling occurs, the brake 62 is released and the reactor system allowed to operated in the design manner.

Many further tests are customarily made of the effect of changing reactivity, reactor peak power, and the effect of the total load and also rapid variations of the load in order to determine the limits over which the reactor would be safely operated. In conjunction with these tests, the operation is controlled by a conventional on-line transfer function device (not shown) such as mentioned by Haubenreich which would determine the system gain and make immediate adjustments in the control rod settings if the system transfer function were outside the predetermined limits of safe operation.

At the same time, in a companion device, a nuclear fuel of U-238 in $H_2O$ is used in a full scale experiment, in which an electric discharge is used to simulate the steam formation in the center of the reactor. These experiments measure the void formation rate and cycle efficiency and determine the most desirable cycle parameters. The result of these experiments is a preliminary "indicator diagram" of the engine, treated as an internal combustion engine in which the pressure as a function of volume is obtained.

Similarly, when finally in operation, indicator diagrams are obtained for the pulsating reactor in order to assist in the later design optimization.

Having described the invention, what is claimed as new in support of Letters Patent is:

1. A nuclear reactor motor comprising a frame, a wall structure attached to said frame and forming a sealed fuel chamber, a quantity of nuclear fuel with a liquid moderator filling said chamber, means forming an opening in said wall structure, a movable element reciprocatably mounted in said opening whereby the volume of said chamber is subject to variation in response to movement of said movable element, a bearing means in said frame reciprocatably supporting said movable element and a surface area on said movable element in communication with the nuclear fuel and liquid moderator in said chamber, said movable element including a mass of material forming part of said movable element, a power member having the ability to absorb power and subsequently expend the absorbed power in a cyclical sequence, said power member being in operative engagement with said movable element and said mass and having a natural periodic power expending cycle in balance with cyclical pulsations of power generated by fission energy in said fuel resulting in expansion of the chamber therein, and a power take-off member in operable association with said movable element, whereby the volume of said chamber is cyclically varied between maximum and minimum amounts, the generation of fission energy being subject to automatic control by said changes in volume as said movable element reciprocates and performs mechanical work.

2. A nuclear reactor motor according to claim 1 wherein the power member is a spring.

3. A nuclear reactor motor as in claim 1 wherein the logarithm of the reactor power fluctuates sinusoidally with frequency of $\omega/2\pi$ and wherein the power follows the formula:

$$n = n_o \exp\left\{\int_0\left[-b+\left\{\left(\frac{1}{\omega}\right)^2+b^2\right\}^{1/2}\right]\sin[\omega t+\sigma]\right\}$$

where $\sigma$ is $\tan^{-1}(b\omega)$ and $b\omega$ is much less than 1.

4. A nuclear reactor motor according to claim 1 wherein the steady state reactivity is modulated sinusoidally about the mean value of zero such that the maximum value of the steady state reactivity occurs when the volume of the chamber is at its minimum value and vice versa.

5. A nuclear reactor motor according to claim 4 wherein the moderator is water.

6. A nuclear reactor motor according to claim 4 wherein the nuclear fuel is U–235.

7. A nuclear reactor motor according to claim 4 wherein the nuclear fuel is in a solution of the moderator.

8. A nuclear reactor motor according to claim 7 wherein the nuclear fuel is U–235 and is in the form of uranium sulfate.

9. A nuclear reactor motor according to claim 4 wherein there is a control rod movably mounted for insertion into and removal from said solution for initiating and stopping generation of fission energy.

10. A nuclear reactor motor according to claim 9 wherein there is a mechanical governor connected between said movable element and said control rod whereby to limit generation of energy by nuclear fission as a load is applied to said movable element.

11. A method of using fission energy generated in a nuclear fuel with liquid moderator comprising sealing said fuel and moderator in a chamber of variable volume, reciprocatably mounting a mechanical work performing means in association with said chamber and connecting said work performing means to said chamber, vaporizing the moderator by heat generated from nuclear fission whereby to generate pressure, providing a natural resonance in said work performing means so as to modulate reactivity of the nuclear reactor at a desired frequency thus automatically controlling cyclical generation of nuclear energy, placing control rods in engagement with said fuel, moving said control rods relative to said fuel and moderator to a selected position commensurate with the work to be performed for initiating production of energy by nuclear fission and for gross control of the energy being released after initiation, and thereafter automatically controlling the cyclical generation of nuclear energy by cyclically changing the volume of said chamber in response to movement of said work performing means.

12. A method of using fission energy generated in a nuclear fuel with liquid moderator according to claim 11 wherein the nuclear fuel is dissolved in the moderator as a solution.

13. A method according to claim 12 including forming said fluid solution of a mixture of salt of U–235 and water, periodically transforming said water into steam by the generation of nuclear energy to increase the volume of said solution and periodically absorbing said steam into said solution to decrease the volume and picking up motion from changes in volume of said solution to do work.

14. The method of using fission energy as in claim 11 in which the logarithm of the reactor power fluctuates sinusoidally with frequency of $\omega/2\pi$ and wherein the power follows the formula:

$$n = n_o \exp\left\{\int_0\left[-b+\left\{\left(\frac{1}{\omega}\right)^2+b^2\right\}^{1/2}\right]\sin[\omega t+\sigma]\right\}$$

15. A method according to claim 11 in which the steady state reactivity is modulated sinusoidally about the mean value of zero such that the maximum value of the steady state reactivity occurs when the volume of the chamber is at its minimum value and vice versa.

16. A method according to claim 13 in which the steady state reactivity is modulated sinusoidally about the mean value of zero such that the maximum value of the steady state reactivity occurs when the volume of the chamber is at its minimum value and vice versa.

References Cited

UNITED STATES PATENTS

| 3,309,622 | 3/1967 | Weiner et al. | 176—39X |

FOREIGN PATENTS

| 696,051 | 10/1964 | Canada | 176—39 |

OTHER REFERENCES

Soviet Journal of Atomic Energy, vol. 5, No. 6, December 1958, A Pulsing Reactor, T. N. Zubarev, pp. 1533, 1534, 1535, 1536, 1537.

REUBEN EPSTEIN, Primary Examiner

U.S. Cl. X.R.

176—65; 60—203